US012062192B2

(12) United States Patent
Gu

(10) Patent No.: US 12,062,192 B2
(45) Date of Patent: Aug. 13, 2024

(54) METHOD, APPARATUS, COMPUTING DEVICE AND COMPUTER-READABLE STORAGE MEDIUM FOR CORRECTING PEDESTRIAN TRAJECTORY

(71) Applicant: BOE TECHNOLOGY GROUP CO., LTD., Beijing (CN)

(72) Inventor: Yu Gu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 498 days.

(21) Appl. No.: 17/486,441

(22) Filed: Sep. 27, 2021

(65) Prior Publication Data
US 2022/0172377 A1 Jun. 2, 2022

(30) Foreign Application Priority Data
Nov. 27, 2020 (CN) .......................... 202011359008.9

(51) Int. Cl.
G06V 40/10 (2022.01)
G06T 7/246 (2017.01)
G06V 10/44 (2022.01)
G06V 10/75 (2022.01)
G06V 40/16 (2022.01)

(52) U.S. Cl.
CPC ............ *G06T 7/248* (2017.01); *G06V 10/457* (2022.01); *G06V 10/751* (2022.01); *G06V 40/10* (2022.01); *G06V 40/168* (2022.01); G06T 2207/30201 (2013.01); G06T 2207/30241 (2013.01)

(58) Field of Classification Search
CPC .......... G06T 7/248; G06T 2207/30201; G06T 2207/30241; G06V 40/168; G06V 10/457; G06V 40/10; G06V 10/751
See application file for complete search history.

(56) References Cited

U.S. PATENT DOCUMENTS 10,262,331 B1 * 4/2019 Sharma ................. H04W 4/029

FOREIGN PATENT DOCUMENTS

| CN | 109753901 A | * | 3/2023 | |
| CN | 109859234 B | * | 3/2023 | |
| JP | 7362102 B2 | * | 10/2023 | |
| WO | WO-2019104949 A1 | * | 6/2019 | ............. G07C 9/257 |

* cited by examiner

Primary Examiner — Shaghayegh Azima
(74) Attorney, Agent, or Firm — Myers Bigel, P.A.

(57) ABSTRACT

A method, an apparatus, a computing device, and a computer-readable storage medium for correcting pedestrian trajectory are disclosed. The method includes obtaining face image frames and body image frames, determining a face identifier for a face area in each of the face image frames, determining an uncorrected face trajectory for the face identifier, determining a body identifier for a body area in each of the body image frames, determining an uncorrected body trajectory for the body identifier, for each of the face image frames and each of the body image frames that are at a same moment, establishing a set of matching relationship between the face identifier and the body identifier, and correcting at least one of the uncorrected face trajectory and the uncorrected body trajectory based on a plurality of sets of matching relationship of a plurality of same moments.

10 Claims, 6 Drawing Sheets

METHOD, APPARATUS, COMPUTING DEVICE AND COMPUTER-READABLE STORAGE MEDIUM FOR CORRECTING PEDESTRIAN TRAJECTORY

RELATED APPLICATIONS

This application claims priority to and the benefit of Chinese Patent Application No. 202011359008.9, filed on Nov. 27, 2020, the content of which is incorporated in its entirety herein by reference.

FIELD

This application generally relates to the field of smart monitoring technology, and specifically relates to a method, an apparatus, a computing device, and a computer-readable storage medium for correcting pedestrian trajectory.

BACKGROUND

The trajectory of a pedestrian can generally be obtained by a trajectory generation method based on face information, or by a trajectory generation method based on body information. The pedestrian trajectory generation method based on face information processes the face images collected by cameras in different areas, and then connects the collection areas of face cameras that have collected the same pedestrian's face images in chronological order, and finally generates the trajectory of the pedestrian on the map. The pedestrian trajectory generation method based on body information processes the body images collected by body cameras in different areas, and connects the world coordinate system positions converted from the positions of the same pedestrian in each image frame in chronological order, and finally generates the trajectory of the pedestrian on the map.

However, in the process of generating pedestrian trajectory based on face information, a face may be missed from detection, resulting in the pedestrian trajectory obtained based on face information failing to pass through all areas that the pedestrian has already visited. On the other hand, in the process of generating pedestrian trajectory based on body information, the trajectory of the same pedestrian may be wrongly determined as belonging to different pedestrians due to sudden changes of the pedestrian's motion state, such as sudden changes in speed or being obscured. Also, the trajectories respectively belonging to different pedestrians may be wrongly determined as a trajectory for one pedestrian.

SUMMARY

According to an aspect of this application, there is provided a method for correcting pedestrian trajectory, comprising: obtaining face image frames and body image frames; determining a face identifier for a face area in each of the face image frames; determining an uncorrected face trajectory for the face identifier; determining a body identifier for a body area in each of the body image frames; determining an uncorrected body trajectory for the body identifier; for each of the face image frames and each of the body image frames that are at a same moment, establishing a set of matching relationship between the face identifier for the face area in said each of the face image frames and the body identifier for the body area in said each of the body image frames; and, correcting at least one of the uncorrected face trajectory and the uncorrected body trajectory based on a plurality of sets of matching relationship of a plurality of same moments.

In some embodiments, for each of the face image frames and each of the body image frames that are at the same moment, establishing the set of matching relationship between the face identifier for the face area in said each of the face image frames and the body identifier for the body area in said each of the body image frames comprises: based on position coordinates of the face area and the body area corresponding to said same moment for the face identifier and the body identifier, determining a matching degree between the face identifier and the body identifier for said same moment, wherein the position coordinates of the face area and the body area are in a same coordinate system; and based on the matching degree between the face identifier and the body identifier for said same moment, establishing the set of matching relationship.

In some embodiments, based on the position coordinates of the face area and the body area corresponding to said same moment for the face identifier and the body identifier, determining the matching degree between the face identifier and the body identifier for said same moment comprises: combining each of the face identifier and each of the body identifier into a group; based on the position coordinates of the face area and the body area of the face identifier and the body identifier in each of the group, determining an overlap ratio of the face area and the body area, so as to obtain the matching degree between the face identifier and the body identifier. Based on the matching degree between the face identifier and the body identifier for said same moment, establishing the set of matching relationship comprises: based on the overlap ratio of the face area and the body area, establishing the set of matching relationship.

In some embodiments, the plurality of same moments comprises a first moment and a second moment, the face identifier comprises a first face identifier, and the body identifier comprises a first body identifier and a second body identifier. Correcting at least one of the uncorrected face trajectory and the uncorrected body trajectory based on the plurality of sets of matching relationship of the plurality of same moments comprises: in response to the set of matching relationship of the first moment comprising that the first face identifier matches with the first body identity and the set of matching relationship of the second moment comprising that the first face identifier matches with the second body identifier, determining that the first body identifier and the second body identifier correspond to a same pedestrian, and connecting the uncorrected body trajectory for the first body identifier to the uncorrected body trajectory for the second body identifier to obtain a corrected body trajectory for said same pedestrian.

In some embodiments, the plurality of same moments comprises a first moment and a second moment, the face identifier comprises a first face identifier and a second face identifier, and the body identifier comprises a first body identifier. Correcting at least one of the uncorrected face trajectory and the uncorrected body trajectory based on the plurality of sets of matching relationship of the plurality of same moments comprises: in response to the set of matching relationship of the first moment comprising that the first face identifier matches with the first body identifier and the set of matching relationship of the second moment comprising that the second face identifier matches with the first body identifier, determining that the first body identifier corresponds to different pedestrians at the first moment and the second moment respectively, and splitting the uncorrected body trajectory for the first body identifier to obtain corrected body trajectories for said different pedestrians.

In some embodiments, the plurality of same moments comprises a first moment and a second moment, the face identifier comprises a first face identifier, and the body identifier comprises a first body identifier. Correcting at least one of the uncorrected face trajectory and the uncorrected body trajectory based on the plurality of sets of matching relationship of the plurality of same moments comprises: in response to the set of matching relationship of the first moment comprising that the first face identifier matches with the first body identifier and the set of matching relationship of the second moment comprising that the first body identifier does not match with any face identifiers, modifying the uncorrected face trajectory for the first face identifier to be passing through a position of the body area of the first body identifier at the second moment to obtain a corrected face trajectory for a pedestrian corresponding to the first face identifier.

In some embodiments, determining the face identifier for the face area in each of the face image frames comprises: determining the face area in each of the face image frames; performing feature extraction on the face area to obtain a face feature vector corresponding to the face area; comparing the face feature vector with sample face feature vectors in a sample face feature database to obtain a most similar sample face feature vector, wherein the most similar sample face feature vector is one of the sample face feature vectors that is most similar to the face feature vector, and wherein each of the sample face feature vectors in the sample face feature database has a corresponding face identifier; in response to a similarity between the face feature vector and the most similar sample face feature vector being greater than or equal to a preset similarity threshold, determining the corresponding face identifier of the most similar sample face feature vector as the face identifier of the face area; in response to the similarity between the face feature vector and the most similar sample face feature vector being less than the preset similarity threshold, determining a new face identifier as the face identifier of the face area, wherein the new face identifier is different from the corresponding face identifier of any of the sample face feature vectors in the sample face feature database.

In some embodiments, determining the body identifier for the body area in each of the body image frames comprises: determining the body area in each of the body image frames; performing feature extraction on the body area to obtain a body feature vector corresponding to the body area; comparing the body feature vector with sample body feature vectors in a sample body feature database to obtain a most similar sample body feature vector, wherein the most similar sample body feature vector is one of the sample body feature vectors that is most similar to the body feature vector, and wherein each of the sample body feature vectors in the sample body feature database has a corresponding body identifier; in response to a similarity between the body feature vector and the most similar sample body feature vector being greater than or equal to a preset similarity threshold, determining the corresponding body identifier of the most similar sample body feature vector as the body identifier of the body area; in response to the similarity between the body feature vector and the most similar sample body feature vector being less than the preset similarity threshold, determining a new body identifier as the body identifier of the body area, wherein the new body identifier is different from the corresponding body identifier of any of the sample body feature vectors in the sample body feature database.

According to another aspect of the application, there is provided an apparatus for correcting pedestrian trajectory, comprising: an image frame obtaining module, configured to obtain face image frames and body image frames; a face identifier determining module, configured to determine a face identifier for a face area in each of the face image frames; an uncorrected face trajectory determining module, configured to determine an uncorrected face trajectory corresponding to the face identifier; a body identifier determining module, configured to determine a body identifier for a body area in each of the body image frames; an uncorrected body trajectory determining module, configured to determine an uncorrected body trajectory corresponding to the body identifier; a matching relationship set establishing module, configured to, for each of the face image frames and each of the body image frames that are at a same moment, establish a set of matching relationship between the face identifier and the body identifier; and a trajectory correcting module, configured to correct at least one of the uncorrected face trajectory and the uncorrected body trajectory based on a plurality of sets of matching relationship of a plurality of same moments According to yet another aspect of the application, there is provided a computing device, comprising: a memory configured to store computer-executable instructions; and a processor configured to execute the computer-executable instructions to cause the computing device to perform the method according to any one of the embodiments of the application.

According to still another aspect of the application, there is provided a computer-readable storage medium, comprising computer-executable instructions that when executed by a processor of a computing device cause the processor to perform the method according to any one of the embodiments of the application.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

DETAILED DESCRIPTION OF THE EMBODIMENTS

Figure 1:
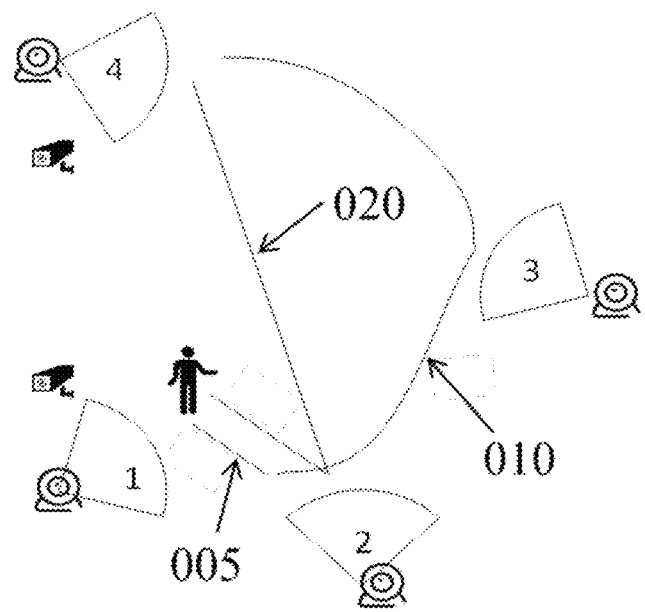
FIG. 1 schematically shows uncorrected pedestrian trajectories.

The application will be further described in detail below with reference to the drawings and embodiments. It can be understood that the specific embodiments described herein are only used for explaining and not for limiting the scope of the present application. In addition, it should be noted that, for ease of description, only the parts that are necessary for understanding the embodiments of the present application are shown in the drawings.

It should be noted that the embodiments in this application and the features in the embodiments can be combined with each other if there is no conflict. Hereinafter, the present application will be described in detail with reference to the drawings and in conjunction with the embodiments.

FIG. 1 schematically shows examples of an uncorrected pedestrian trajectory obtained based on face information and an uncorrected pedestrian trajectory obtained based on body information. In the scene in FIG. 1, the reality is that a pedestrian passes through area 1, area 2, area 3 and area 4 sequentially. However, the pedestrian trajectory obtained based on the face information is shown as trajectory 020, in which, after reaching the area 2, the pedestrian travels directly to the area 4 without passing through the area 3. The reason is that when the pedestrian travels to the area 3, its face may be obscured, or does not face the face camera of area 3 in a sufficient way. As a result, the face camera of the area 3 does not capture the face of the pedestrian, causing the resulting face trajectory of the pedestrian shown to be not passing through the area 3. In addition, the pedestrian trajectories obtained based on the body information are shown as both trajectory 005 and trajectory 010. In other words, the pedestrian's body trajectory is divided into two parts. Of these two trajectories, only one will be considered as the pedestrian's body trajectory. The reason is that in the process of moving, the pedestrian may suddenly change its motion state (for example, suddenly accelerate the movement) or be severely obscured for a relatively long time, causing the pedestrian to be recognized as another pedestrian. As a result, the pedestrian's body trajectory is determined to end at the end of the body trajectory 005, and the body trajectory 010 is considered to belong to another pedestrian. Therefore, the above-mentioned face trajectory and body trajectories may incorrectly reflect the actual trajectory of the pedestrian in some cases.

Figure 2:
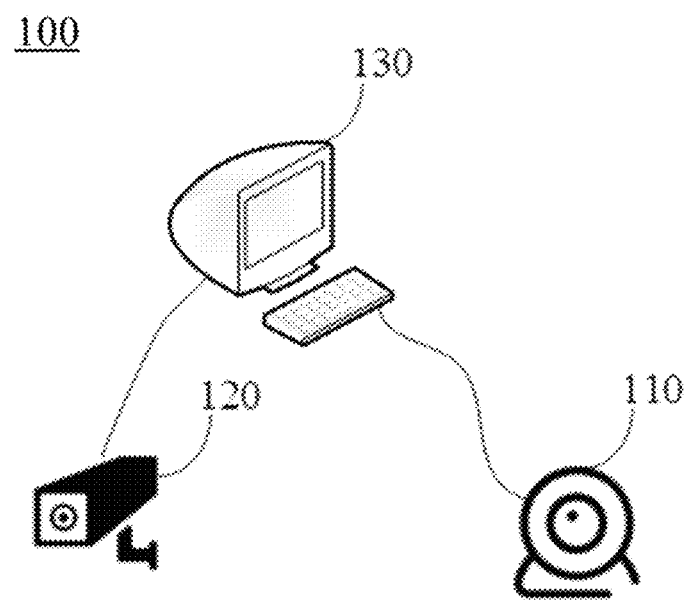
FIG. 2 schematically shows an exemplary network scenario in which the technical solution according to the embodiments of the present application can be implemented.

FIG. 2 schematically shows a network architecture in which the technical solutions of the embodiments of the present application can be implemented. As shown in FIG. 2, the network architecture 100 includes: at least one face camera 110, at least one body camera 120, and an image processing device 130. The face camera 110 and the body camera 120 are connected to the image processing device 130 respectively. The connection can be wired or wireless. The resolution of the face camera 110 may be relatively large, such as 1080p, because the area of the face is relatively small. The installation height of the face camera 110 may be between 2 meters and 2.5 meters, so as to collect clear face information. The face camera 110 may be a circular camera, the image acquisition angle of which can be relatively small, for example, close to the horizontal angle, so that the shape change of the collected face image due to the acquisition angle is relatively small. The resolution of the body camera 120 may be relatively small, such as 720p, because the area of the body image is relatively large. The installation height of the body camera 120 can be equal to or more than 3 meters in order to collect complete body information. The body camera can be a gun-type camera or a bullet camera. The image acquisition angle of the body camera is relatively large, in order to record the body's motion range more broadly. The image processing device 130 may be a terminal device or a server with image processing and data storage functions, for example, a mobile computer or a desktop computer.

It can be understood that, in the embodiments of the present application, the at least one face camera 110 and the at least one body camera 120 can be set in any region where target needs to be monitored. After the face camera 110 and the body camera 120 are powered on, they can collect images within their target collection range, generate image information, and send the image information to the image processing device 130 in real time or periodically.

The image processing device 130 may receive and store the image information, and extract face information and body information from the image information. For example, the image processing device 130 may determine the face area in the images provided by the face camera, and vectorize the face area to obtain the feature vector of the face area. This feature vector can characterize the face image. The term "face image" can be understood as the image of the face area. Similarly, the image processing device 130 may determine the body area in the image provided by the body camera, and vectorize the body area to obtain the feature vector of the body area. This feature vector can characterize the body image. The term "body image" can be understood as the image of the body area.

After obtaining the image information of each image frame generated by the face camera (hereinafter, the image frame generated by the face camera may also be referred to as the first image frame), the image processing device 130 can determine whether these image frames contain a face area. If it does, the first image frame is determined as a face image frame. Then, determine the face area in the face image frame. The size and position of the face area depend on the size of the image of the face and the position of the image of the face in the face image frame. After determining the face area, by vectorizing the face area, the feature vector of the face area can be obtained. Then based on the feature vector, it can be found in a face feature database (which may also be referred to as the sample face feature database hereinafter) a sample face feature vector that is most similar to the feature vector, and the face identifier of the most similar sample face feature vector is determined as the face identifier of the face area. If the similarity between the feature vector and the most similar sample face feature vector is still low, a new face identifier different from the face identifier of any sample face feature vector is determined for the face area. Then, the image processing device 130 may generate a trajectory corresponding to the face identifier (hereinafter referred to as a face trajectory) based on the positions in the real world of the face areas corresponding to the face identifier in various face image frames. The position of the face area in the real world can be obtained in different ways. For example, the coordinate system of the image collected by the face camera can be converted into the world coordinate system through the coordinate system conversion, and then the position of the face area in the world coordinate system can be calculated. Then, in chronological order, connect the positions of the face areas of the same face identifier in different face frames in the world coordinate system to obtain the face trajectory of the face identifier corresponding to the face areas. For another example, the face trajectory of the face identifier corresponding to the face areas can be determined based on the time sequence connection of the positions of the face cameras that captured the face areas.

After obtaining the image information of each image frame generated by the body camera (the image frame generated by the body camera may also be referred to as the second image frame hereinafter), the image processing device 130 can determine whether each of these image frames contains a body area. If it does, it is determined that the second image frame is a body image frame. Then, determine the body area in the body image frame. The size and position of the body area depends on the size of the image of the body and the position of the image of the body in the body image frame. After the body area is determined, by vectorizing the body area, the feature vector of the body area can be obtained. Then, based on the feature vector, it can be found in a body feature database (which may also be referred to as the sample body feature database hereinafter) a sample body feature vector that is most similar to the feature vector of the body area, and the body identifier of the most similar sample body feature vector is determined as the body identifier of the body area. If the similarity between the feature vector and the most similar sample body feature vector is still low, a new body identifier different from the body identifier of any sample body feature vector is determined for the body area. Then, the image processing device 130 may generate a trajectory corresponding to the body identifier (hereinafter referred to as a body trajectory) based on the positions in the real world of the body areas corresponding to the body identifier in different body image frames. The position of the body area in the real world can be obtained in different ways. For example, the coordinate system of the image collected by the body camera can be converted into the world coordinate system through the coordinate system conversion, and then the position of the body area in the world coordinate system can be calculated. Then, in chronological order, connect the positions of the body areas corresponding to the same body identifier in the world coordinate system to obtain the body trajectory of the body identifier corresponding to the body areas.

In addition, the inventor realized that if the face camera 110 and the body camera 120 shoot the same pedestrian at the same moment, then the obtained positions of the pedestrian's face area and body area in the same reference system (for example, the world coordinate system) should be substantially the same. Therefore, the face identifier corresponding to face area in the face image frame and the body identifier corresponding to the body area in the body image frame that are shoot at the same moment can be matched with each other based on this realization. Based on the matching results, if the matching situation between the face identifier and the body identifier at a certain moment is inconsistent with the matching situation between the same face identifier and the same body identifier at another moment, it means that the face area at one of the moments is not provided with the correct face identifier or the body area at one of the moments is not provided with the correct body identifier, and also the correct face identifier or the correct body identifier can be determined. Then, the pedestrian's trajectory corresponding to the face identifier or body identifier can be corrected based on this. For example, if the same face identifier matches with different body identifiers at different moments, it means that the different body identifiers actually correspond to a same pedestrian, then the body trajectories of the different body identifiers can be connected to obtain the body trajectory of that same pedestrian. For another example, if the same body identifier matches with different face identifiers at different moments, it means that the same body identifier actually corresponds to different pedestrians at the different moments, and the body trajectory corresponding to the same body identifier can be split to obtain the body trajectories of those different pedestrians. For another example, if a face identifier matches with a body identifier at a certain moment, but does not match with any body identifier at another moment, it means that the face of the pedestrian corresponding to the face identifier is not detected at that another moment. Then, the face trajectory corresponding to the face identifier can be modified to pass through the position of the body area of the body identifier at that another moment, to obtain the corrected face trajectory of the pedestrian corresponding to the face identifier.

Figure 3:
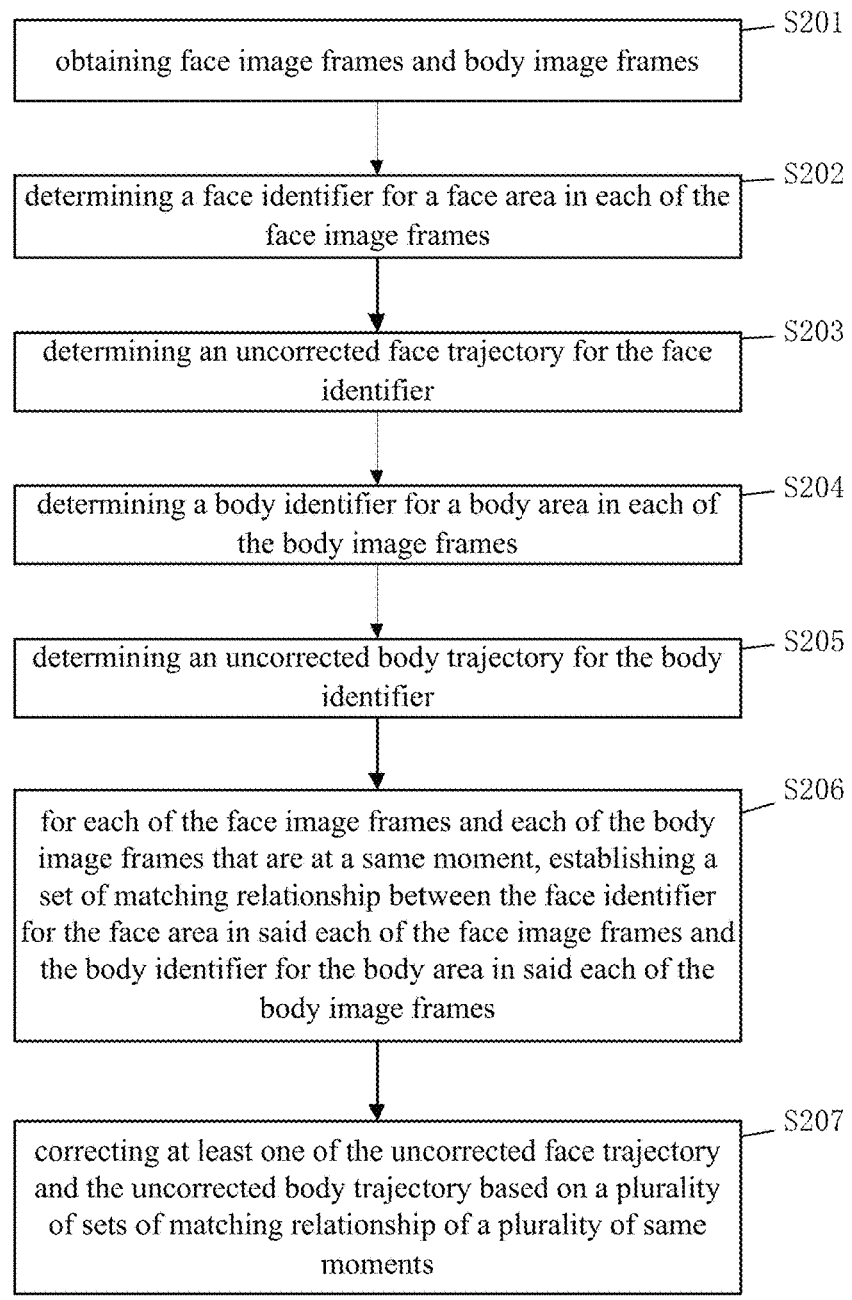
FIG. 3 schematically shows a flowchart of a method for correcting pedestrian trajectory according to an embodiment of the present application.

According to an aspect of the present application, a method for correcting pedestrian trajectory is provided. This method can be applied to the network architecture shown in FIG. 2. FIG. 3 schematically shows a flowchart of the method for correcting pedestrian trajectory according to an embodiment of the present application. As shown in FIG. 3, the method comprises the steps of:

at step S201, obtaining face image frames and body image frames;

at step S202, determining a face identifier for a face area in each of the face image frames;

at step S203, determining an uncorrected face trajectory for the face identifier;

at step S204, determining a body identifier for a body area in each of the body image frames;

at step S205, determining an uncorrected body trajectory for the body identifier;

at step S206, for each of the face image frames and each of the body image frames that are at a same moment, establishing a set of matching relationship between the face identifier for the face area in said each of the face image frames and the body identifier for the body area in said each of the body image frames; and at step S207, correcting at least one of the uncorrected face trajectory and the uncorrected body trajectory based on a plurality of sets of matching relationship of a plurality of same moments.

These steps are described in detail below.

First, in step S201, the face camera collects images within the corresponding target collection range to obtain multiple face image frames. In addition, the body camera collects images within the corresponding target collection range to obtain multiple body image frames. The size of the face is relatively small, and the head often rotates, so it is difficult to capture face images. For example, face images are usually difficult to capture continuously. Therefore, the pedestrian trajectory obtained based on the face images is usually coarse-grained, for example, the trajectory is formed by a few points with larger spacing. However, the specificity of the face image is strong, so once the face image is captured, the identity of the pedestrian can generally be accurately determined. On the other hand, the size of the body is relatively large and does not rotate by itself, so it is easy to be captured. Therefore, the pedestrian trajectory obtained based on the body images is usually fine-grained, for example, the trajectory is formed by a lot of points with smaller spacing. However, the specificity of the body image is poor, so it is more difficult to determine the identity of a pedestrian based on a single body image. Due to the above-mentioned differences between the face trajectory and the body trajectory, each of them has a more suitable application scenario.

Then, face detection is performed on the image frame collected by the face camera to determine whether the image frame contains a face area. If so, the image frame is determined to be a face image frame; if not, the image frame is discarded. Similarly, body detection is performed on the image frame collected by the body camera to determine whether the image frame contains a body area. If so, the image frame is determined to be the body image frame; if not, the image frame is discarded.

Then, in step S202, the face identifier is determined for the face area in the face image frame, and in step S203, the uncorrected face trajectory corresponding to the face identifier is determined.

In some embodiments, feature extraction (vectorization) may be performed on the face area in the face image frame to obtain a face feature vector corresponding to each face area. Then, compare the face feature vector with the sample face feature vectors in the sample face feature database to obtain the face identifier corresponding to the face area. The sample face feature database is composed of sample face feature vectors, and each sample face feature vector has a corresponding face identifier.

The process of comparing the face feature vector with the sample face feature vector in the sample face feature database to obtain the face identifier corresponding to the face area may include: comparing the face feature vector with each sample face feature vector in the sample face feature database to determine the similarity between the face feature vector and each of the sample face feature vectors. Then, the maximum similarity is determined among these similarities. Then, it is determined whether the value of the maximum similarity is greater than a preset similarity threshold. If it is, the face identifier of the sample face feature vector corresponding to the maximum similarity is determined as the face identifier of the face area in the face image frame. If not, set a new face identifier for the face area. The new face identifier is different from the face identifier corresponding to each sample face feature vector. Then, the feature vector of the face area and the new face identifier can be stored in the sample face feature database to update the sample face feature database. The face similarity threshold may be determined based on actual needs, which is not limited in the embodiments of the present application.

There are two ways to obtain the sample face feature database.

In an optional implementation, the sample face feature database may be pre-established. For example, if the people who will be visiting a park have been determined, the face image of each person can be collected first and the feature vector of that each person can be extracted, and then a sample face feature database can be formed base on the feature vectors. For example, if the park is a company, and the people who will visit the park are the employees of the company, then in this case, the identity of the people who are daily active in the park is determined, so a sample face feature database can be created in advance. The process of establishing a sample face feature database can be: first collect the face image of each target pedestrian, then perform feature extraction on each face image to obtain each sample face feature vector, and set the corresponding face identifier for each sample face feature vector, thereby establishing the correspondence between the sample face feature vector and the face identifier in order to generate a sample face feature database. The face identifier can be the name or code number of the target pedestrian.

In an alternative implementation, the sample face feature database is not pre-established. The sample face feature database is established after the pedestrian trajectory correction system is built and run. The feature vectors of the face areas in the face image frames of a preset number are chosen as the sample face feature vectors, and a face identifier is set for each sample face feature vector to establish the correspondence between each sample face feature vector and the face identifier to generate the sample face feature database. In addition, if it is determined that multiple face areas in different image frames belong to the same pedestrian, a single feature vector can be generated based on the multiple face areas, instead of generating a feature vector for each face area. For example, through a face tracking unit, it can be found that two face images with similar positions in adjacent two frames may belong to the same pedestrian. Therefore, the face tracking algorithm can be used to predict the positions of the same pedestrian in different image frames, and after determining that the two face images belong to the same pedestrian, a feature vector is determined based on the two face images.

It should be noted that, in the embodiments of the present application, the sample face feature vector corresponding to the face identifier in the sample face feature database can be updated after a preset period. The process may be: after the preset period, after obtaining the new face feature image corresponding to the face identifier in the sample face feature database, determine the new face feature image as the updated sample face image corresponding to the face identifier. That is, updating the sample face feature vector of the face identifier based on the feature vector of the new face feature image. The preset period may be determined based on actual needs, which is not limited in the embodiments of the present application. For example, the sample face feature database can be updated every three months. By updating the sample face feature database, the problem that the original sample face feature vector cannot accurately reflect the facial features of the same pedestrian due to the change of the facial feature of the pedestrian can be solved, and the recognition accuracy of the face area can be improved.

In the embodiments of the application, each first image frame includes position information and time information in addition to the face area information based on the face image. The position information can be the position and angle of the face camera corresponding to the first image frame, or the position information of the pedestrian in the park corresponding to the face area. The time information may be the collection moment of the first image frame. Therefore, based on the first image frame, the position of the pedestrian corresponding to the face area and the moment when the pedestrian appears at the position can also be determined.

Then, in step S203, the face positions corresponding to the same face identifier can be connected sequentially according to the moments of the face image frames to obtain the pedestrian's uncorrected face trajectory. For example, the positions of the face cameras that capture the face areas corresponding to the same face identifier can be connected in the order of shooting time, or a certain point of the respective viewing area of each of the face cameras (for example, the center point of the viewing area) that capture the face areas corresponding to the same face identifier can be connected. It is also possible to first convert the coordinate system of the face area in the face image frame to obtain the position of the face area in the world coordinate system, and then connect the world coordinate system positions of the face areas corresponding to the same face identifier in chronological order.

It is understandable that the number of the uncorrected face trajectory can be at least one.

In the embodiments of the present application, the pedestrian trajectory information may be generated offline. In order to improve the accuracy of the pedestrian trajectory information, after obtaining a certain amount of face area and face identifier and body area and body identifier, it is needed to establish a set of matching relationship between the face identifier and the body identifier according to the preset period. The set of matching relationship helps generate the trajectory information of pedestrians within the target collection range of each period, which can contribute to obtain more accurate trajectory information of pedestrians within the duration of each period. For example, starting at 23:50 every day, based on at least one face area and its face identifier and at least one body area and its body identifier acquired on that day, the matching relationship between the face identifier and the body identifier (that is, which face identifier matches with which body identifier) is established, and the pedestrian trajectory of the day is generated.

Next, the step S204—determining a body identifier for a body area in each of the body image frames and step S205—determining an uncorrected body trajectory for the body identifier will be described.

In step S204, feature extraction may be performed on each body area in each body image frame to obtain a body feature vector for each body area. Then, compare the body feature vector with the sample body feature vectors in the sample body feature database to determine the similarity between the body feature vector and each of the sample body feature vectors, and obtain the sample body feature vector with the greatest similarity to the body feature vector. Then, similar to step S202, based on whether the maximum similarity is greater than a preset similarity threshold, determine that whether the body identifier of the sample body feature vector corresponding to the maximum similarity is determined as the body identifier of the body area or a new body identifier should be set for the body area.

It can be understood that, in the embodiments of the present application, the process of determining the body identifier of the body area can refer to the process of determining the face identifier of the face area described in step S202, which will not be described in detail in this embodiment of the application.

In addition, the process of obtaining the sample body feature database can refer to the aforementioned process of obtaining the sample face feature database, which will not be described in detail in this embodiment. Similarly, the sample body feature vector in the sample body feature database can also be updated after a preset period to improve the recognition accuracy of the body area.

In order to determine the uncorrected body trajectory corresponding to the body identifier, the coordinate of the position of the body area in the second image frame need to be converted to the coordinate in the world coordinate system. The process of transforming the coordinate system of the position coordinate of the body area can include: selecting multiple target positions on the ground, determining the position coordinate of each target position in the world coordinate system, and the position coordinate of each target position in the pixel coordinate system of the image taken by the body camera. Based on the two sets of position coordinates, a conversion matrix for converting each target position from the pixel coordinate system to the world coordinate system can be determined. The conversion matrix is a homography matrix between the world coordinate system and the pixel coordinate system. It is understandable that, since the world coordinate system is based on the ground, the coordinate conversion can usually be performed on the position coordinates of the foot/feet area of the body area to obtain the world coordinate system position of the body area after the conversion.

Figure 4:
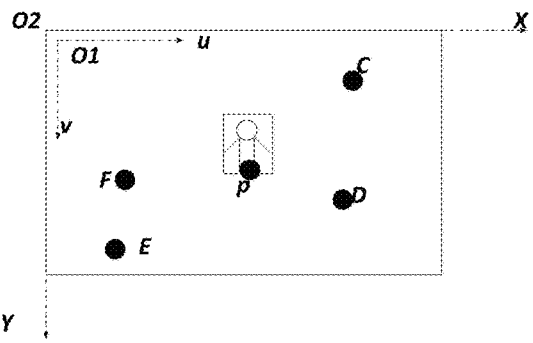
FIG. 4 schematically shows a coordinate conversion diagram for converting the coordinate system of the image frame collected by the camera into the world coordinate system.

FIG. 4 schematically shows a coordinate conversion diagram for converting the coordinate system of the image frame collected by the camera into the world coordinate system. As shown in FIG. 4, a world coordinate system with $O_2$ as the origin is established. The abscissa of the world coordinate system is X, and the ordinate of the world coordinate system is Y. Four target positions of C, D, E, and F are arbitrarily selected in the world coordinate system. The position coordinates of the four target positions in the world coordinate system are C $(X_1, Y_1)$, D $(X_2, Y_2)$, E $(X_3, Y_3)$ and F $(X_4, Y_4)$. The coordinate origin of the pixel coordinate system is $O_1$. The abscissa of the pixel coordinate system is u, and the ordinate of the pixel coordinate system is v. The position coordinates of the four target positions in the pixel coordinate system are C (u1, v1), D (u2, v2), E (u3, v3) and F (u4, v4). It can be obtained that the conversion matrix H between the pixel coordinate system and the world coordinate system satisfies the following equation:

$$\begin{bmatrix} X \\ Y \\ 1 \end{bmatrix} = H \begin{bmatrix} u \\ v \\ 1 \end{bmatrix};$$

Then, the position coordinate of the body area can be converted based on the homography matrix H to obtain the position coordinate P of the body area in the world coordinate system.

In the embodiments of the present application, each second image frame includes position information and time information. The position information may be the position and angle of the body camera corresponding to the second image frame. The time information may be the acquisition time of the second image frame. The body area determined based on the second image frame may include the body location information and time information corresponding to the body area.

In step S205, an uncorrected body trajectory corresponding to the body identifier may be generated. The process includes: determining the position information of the body area in each body image frame corresponding to the same body identifier, converting the position information corresponding to the same body identifier into the position in the world coordinate system, and then connects the positions of the body areas according to the time sequence corresponding to the body image frames, to get the uncorrected body trajectory. It is understandable that the number of the uncorrected body trajectory may be at least one.

In the embodiment of the present application, the sequence of the two processes of determining the uncorrected face trajectory and determining the uncorrected body trajectory does not affect the realization of the method for correcting the pedestrian trajectory of the present application. The determination of the uncorrected face trajectory (that is, steps S202 and S203) may be performed before the determination of the uncorrected body trajectory (that is, the steps S204 and S205), and the determination of the uncorrected face trajectory may also be performed after the determination of the uncorrected body trajectory.

Next, step S206 will be described.

In step S206, based on the face image frame and the body image frame that correspond to the same moment, a set of matching relationship between the face identifier and the body identifier is established. The set of matching relationship includes the matching relationship between each of the face identifiers and each of the body identifiers, for example, which body identifier is matched to which face identifier, and/or which face identifier is matched to which body identifier. These matching relationships are gathered into a set.

In order to improve the accuracy of pedestrian trajectory information, a matching relationship between face identifier and body identifier can be established after obtaining a certain amount of face areas and face identifiers and a certain amount of body areas and body identifiers, and then at least one of the face trajectory and the body trajectory can be corrected based on multiple sets of matching relationship. Since a pedestrian can only appear in one position at a moment, the positions of the face area and body area of the same pedestrian at the same moment in the same coordinate system should be the same. Therefore, the matching relationship between the face identifier and the body identifier can be determined based on the positions of the face area and the body area of the same moment in the same coordinate system. For example, the greater the degree of overlap between the position of the face area and the position of the body area, the higher the matching degree between the face identifier corresponding to the face area and the body identifier corresponding to the body area, that is, the greater the likelihood of the face identifier and the body identifier being corresponding to the same pedestrian. Moreover, in theory, the same pedestrian can only have one face identifier and one body identifier. In other words, one face identifier should only match with one body identifier at each moment, and vice versa. Then, if the same face identifier matches with different body identifiers at different moments, or the same body identifier matches with different face identifiers at different moments, it means that the pedestrian's face identifier or body identifier in a certain moment is wrong, leading to the face trajectory for the face identifier or the body trajectory for the body identifier being wrong, thus it needs to be corrected.

Figure 5:
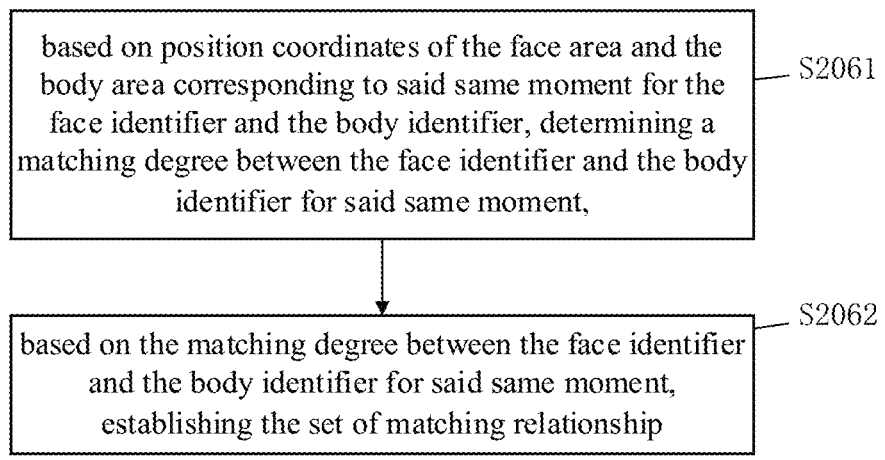
FIG. 5 schematically shows a flowchart of a method for correcting pedestrian trajectory according to another embodiment of the present application.

FIG. 5 schematically shows a sub-process of step S206. As shown in FIG. 5, the sub-process may include:

at step S2061, based on position coordinates of the face area and the body area corresponding to said same moment for the face identifier and the body identifier, determining a matching degree between the face identifier and the body identifier for said same moment, wherein the position coordinates of the face area and the body area are in a same coordinate system; and at step S2062, based on the matching degree between the face identifier and the body identifier for said same moment, establishing the set of matching relationship based on the determination of the body identifier matched by each face identifier and the face identifier matched by each body identifier at the same moment.

These steps are described separately below.

In step S2061, for the face image frame and the body image frame obtained at the same moment, each of the face identifiers in the face image frame may be combined with each of the body identifiers in the body image frame to form a group. Then, based on the position coordinates of the face area and the body area for the face identifier and body identifier in each group, determine the overlap ratio of the face area and the body area of the face identifier and body identifier in each group. The overlap ratio can characterize the matching degree between the face identifier and the body identifier in each group. In this process, the face area and the body area are unified into the same reference system, such as the world coordinate system. In the world coordinate system, the position of the face area can be the orthographic projection of the head on the ground, and the position of the body area can be the orthographic projection of the body on the ground. The overlap ratio of the face area and the body area may be the ratio of the overlapping area of the two projections to the union area of the two projections.

In some embodiments, a cost value of each group may be determined based on the difference between a standard value and the overlap ratio, and a cost matrix may be generated based on the cost value of each group. In some embodiments, the standard value is 1. Each element in the cost matrix is used to indicate the possibility that an association exists between the face identifier and the body identifier.

For example, suppose that P face areas F are obtained in the face image frame of a certain moment, and each face area has a corresponding face identifier, that is, a total of P face identifiers $(f_1, f_2, f_3, \ldots, f_{p-1}, f_p)$ are obtained, and that Q body areas B are obtained in the body image frame of the same moment, and each body area has a corresponding body identifier, that is, a total of Q body identifiers $(b_1, b_2, b_3, \ldots, b_{q-1}, b_q)$ are obtained, then the groups of each of the face identifiers of P face areas and each of the body identifiers of the Q body areas can include: $(f_1, b_1), (f_1, b_2), (f_1, b_3), \ldots, (f_1, b_{q-1}), (f_1, b_q); (f_2, b_1), (f_2, b_2), (f_2, b_3), \ldots (f_2, b_{q-1}), (f_2, b_q); \ldots ; (f_p, b_1), (f_p, b_2), (f_p, b_3), \ldots, (f_p, b_{q-1}), (f_p, b_q)$.

Then, obtain the position coordinate of the face area corresponding to the face identifier and the position coordinate of the body area corresponding to the body identifier, the face identifier and the body identifier being in a same group. The position coordinate of the face area can be expressed as $(f_{x1}, f_{y1}; f_{x2}, f_{y2})$. $(f_{x1}, f_{y1})$ is the position coordinate of the upper left corner of the face area, and $(f_{x2}, f_{y2})$ is the position coordinate of the lower right corner of the face area. The position coordinates of the body area can be expressed as $(b_{x1}, b_{y1}; b_{x2}, b_{y2})$. $(b_{x1}, b_{y1})$ is the position coordinate of the upper left corner of the body area, $(b_{x2}, b_{y2})$ is the position coordinate of the lower right corner of the body area.

Then, the overlap ratio of the face area and the body area corresponding to the face identifier and the body identifier in each group can be calculated by $$\text{overlap ratio} = \frac{A \cap B}{A \cup B},$$

where A is the range of the face area in the group (for example, the range of the projection of the face or head on the ground), B is the range of the body area in the group (for example, the range of the projection of the body or foot/feet on the ground). $A \cap B$ represents the area of the overlapping part of the two ranges, and $A \cup B$ represents the union area of the two ranges.

Then, the difference between the standard value 1 and the overlap ratio can be calculated to determine the cost value of each group:

$$\text{cost} = 1 - \frac{A_n \cap B_m}{A_n \cup B_m}.$$

Based on the cost value of each group, a cost matrix can be generated. Table 1 schematically shows the cost matrix of the overlap ratio of the groups of the face identifiers and the body identifiers for the same moment. In the embodiment shown in Table 1, since P face areas are obtained in the face image frame and Q body areas are obtained in the body image frame, the cost matrix has P rows and Q columns. Each element in the matrix can reflect the degree of overlap between the face area and the body area for the face identifier and the body identifier in one of the groups. The higher the degree of overlap, the higher the matching degree is.

TABLE 1

|  | $b_1$ | $b_2$ | $b_3$ | ... | $b_{q-1}$ | $b_q$ |
|---|---|---|---|---|---|---|
| $f_1$ | 4/7 | 1/3 | 0 |  | 4/5 | 7/8 |
| $f_2$ | 6/7 | 3/7 | 0 |  | 1/2 | 4/9 |
| $f_3$ | 2/3 | 4/5 | 6/7 |  | 1/8 | 5/7 |
| ... |  |  |  |  |  |  |
| $f_{p-1}$ | 5/6 | 2/3 | 3/8 |  | 3/4 | 5/7 |
| $f_p$ | 1/3 | 0 | 2/5 |  | 0 | 6/7 |

Then, in step S2062, based on the matching degree between each face identifier and each body identifier, determine the body identifier matched by each face identifier and the face identifier matched by each body identifier at the same moment. By summarizing these matching relationships, the set of matching relationship can be obtained.

In some embodiments, the matching degree is represented by the overlap ratio. Therefore, in this step, based on the overlap ratio of the face area and the body area corresponding to the face identifier and the body identifier in each group, the body identifier matched by each face identifier and the face identifier matched by each body identifier at the same moment is determined to obtain the set of matching relationship.

In a specific embodiment, the cost matrix may be processed to obtain the body identifier matched by each face identifier and the face identifier matched by each body identifier. For example, the Hungarian Algorithm model can be used to process the cost matrix. In this algorithm, if the value in Table 1 is 0, it is considered that there is no association between the corresponding body identifier and face identifier. If the value is not 0, then it can be considered that there is an association between the corresponding body identifier and face identifier (i.e., there is a possibility of matching). The Hungarian algorithm can match as many face identifiers and body identifiers as possible with matching possibilities, that is, to achieve the maximum matching of body identifiers and face identifiers at the same moment. The matching results obtained are combined to form a set of matching relationship. If the number of P and Q is not the same, there must be a face identifier or a body identifier that fails to be matched. The set of matching relationship includes not only the matched face identifier and body identifier, but also the result that a face identifier or a body identifier is not matched.

In other embodiments, the Kuhn-Munkres Algorithm (KM algorithm) model may also be used to process the cost matrix. Unlike the Hungarian algorithm, which only considers whether there is an association (i.e., the inputs can only be 1 and 0), the input of the KM algorithm model includes the cost value of each group of face identifier and body identifier. Therefore, the KM algorithm adds weights based on the degree of overlap when determining the matching relationship, so that the face identifier and body identifier with higher overlap are more likely to be matched in a group.

In some embodiments, multiple face images in the same face image frame may be provided with the same face identifier, and multiple body images in the same body image frame may also be provided with the same body identifier. This is not necessarily due to the performance problems of the face camera or the body camera or the feature extraction algorithm problems. It may also be caused by the fact that multiple face images or multiple body images are objectively close to each other.

For example, suppose that P face areas F are obtained in the face image frame of a certain moment, and the respective face identifiers of the P face areas are $f_1, f_2, f_1, \ldots, f_3, f_2$ (it can be seen that among the P face areas, the first face area and the third face area are provided with the same face identifier $f_1$, and the second face area and the $p^{th}$ face area are provided with the same face identifier $f_2$), and Q body areas B are obtained in the body image frame of the same moment, and the respective body identifiers of these Q body areas are $b_1, b_2, b_4, \ldots, b_1, b_2$ (it can be seen that among the Q body areas, the first body area and the $q-1^{th}$ body area is provided with the same body identifier $b_1$, and the second body area and the $q^{th}$ body area are provided with the same body identifier $b_2$). Then, the cost matrix obtained in the case of this example can be shown in Table 2.

TABLE 2

|  | $b_1$ | $b_2$ | $b_4$ | ... | $b_1$ | $b_2$ |
|---|---|---|---|---|---|---|
| $f_1$ | 6/7 | 1/3 | 2/5 |  | 4/5 | 7/8 |
| $f_2$ | 0 | 2/3 | 0 |  | 5/6 | 4/9 |
| $f_1$ | 2/3 | 4/5 | 6/7 |  | 1/8 | 3/8 |
| ... |  |  |  |  |  |  |
| $f_3$ | 1/2 | 3/7 | 5/7 |  | 3/4 | 5/7 |
| $f_2$ | 1/3 | 0 | 0 |  | 6/7 | 4/7 |

In this case, the above algorithm model can be improved by requiring that in the set of matching relationship, one face identifier can only be matched with one body identifier.

The method for correcting pedestrian trajectory according to an embodiment of the present application further includes, at step S207, correcting at least one of the uncorrected face trajectory and the uncorrected body trajectory based on a plurality of sets of matching relationship of a plurality of same moments. Step S207 will be described in detail below.

In this step, multiple face identifiers or multiple body identifiers can be merged, or a face identifier or a body identifier can be split based on multiple sets of matching relationship of multiple moments, so as to obtain the pedestrians actually corresponding to the face identifiers or the body identifiers. Specifically, there are the following three optional implementations.

In an optional implementation, the plurality of same moments comprises a first moment and a second moment. The set of matching relationship of the first moment comprises that the first face identifier matches with the first body identity and the set of matching relationship of the second moment comprises that the first face identifier matches with the second body identifier. These situations mean that the first body identifier and the second body identifier correspond to a same pedestrian. The reason for this may be that the pedestrian was obscured or suddenly changed its motion state, causing the body camera to lose track of the pedestrian, and the pedestrian's body trajectory was determined to be terminated. When the pedestrian is recognized again, it is regarded as a new pedestrian, and its subsequent trajectory is regarded as body trajectory belonging to the new pedestrian.

In this case, the first body identifier and the second body identifier can be merged, that is, it can be confirmed that the first body identifier and the second body identifier correspond to a same pedestrian. Therefore, the entirety of the trajectory of the same pedestrian should include both the uncorrected body trajectory corresponding to the first body identifier and the uncorrected body trajectory corresponding to the second body identifier. Then, in order to obtain the complete trajectory of the pedestrian, the uncorrected body trajectory corresponding to the first body identifier can be connected with the uncorrected body trajectory corresponding to the second body identifier. For example, connect the end of the uncorrected body trajectory corresponding to the first body identifier to the start of the uncorrected body trajectory corresponding to the second body identifier to obtain the corrected body trajectory of the pedestrian.

In the above case, the first body identifier and the second body identifier are the body identifiers to be merged. The body identifiers to be merged refer to the body identifiers of the pedestrian corresponding to the body trajectory information to be generated. Since the uncorrected body trajectory corresponding to each body identifier has been determined in the previous step S205, the body trajectory corresponding to the body identifiers to be merged can be determined now. Then, by splicing the body trajectories, the corrected body trajectory can be obtained.

Figure 6:
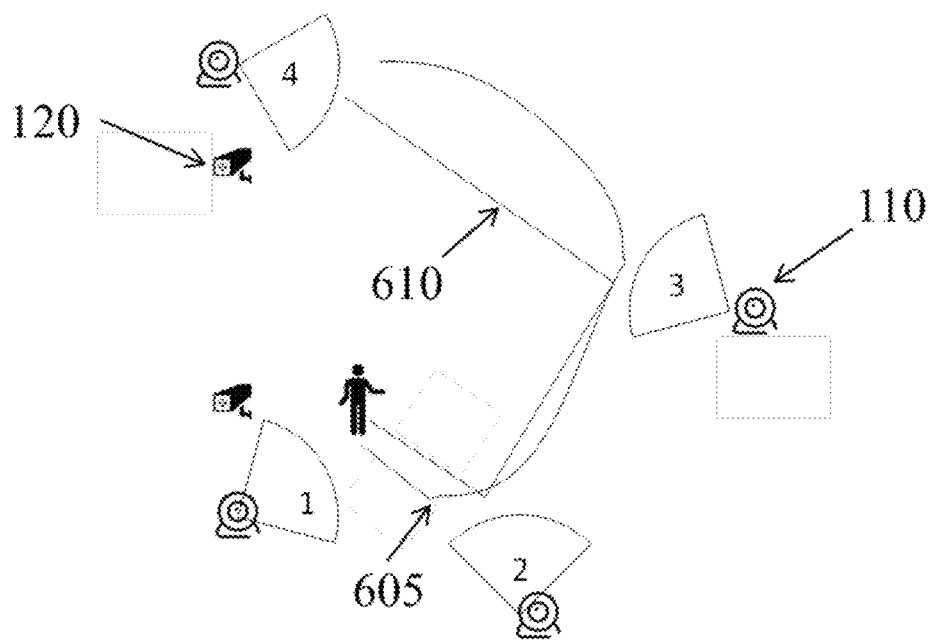
FIG. 6 schematically shows corrected trajectories obtained by using a method for correcting pedestrian trajectory according to an embodiment of the present application.

FIG. 6 shows a specific application scenario in which the method for correcting pedestrian trajectory according to an embodiment of the present application is applied to correct a body trajectory. For comparison, FIG. 1 shows the uncorrected body trajectory. As shown in FIG. 1, after steps S203 and S205, the uncorrected body trajectories 005 and 010 and the uncorrected face trajectory 020 have been obtained. The uncorrected body trajectory 005 corresponds to the body identifier of B_1 and the uncorrected body trajectory 010 corresponds to the body identifier of B_2. The uncorrected face trajectory 020 corresponds to the face identifier of F_1.

According to the set of matching relationship between the face identifier and the body identifier of each moment obtained in step S206, it is found that at the first moment, the face identifier F_1 matches with the body identifier B_1. At the second moment, the face identifier F_1 matches with the body identifier B_2. These two matching relationships indicate that the body identifiers B_1 and B_2 actually target the same pedestrian. That is, the uncorrected body trajectories 005 and 010 are both the pedestrian's body trajectories. Therefore, the pedestrian's corrected body trajectory should include both the uncorrected body trajectories 005 and 010. Therefore, in order to obtain the corrected body trajectory of the pedestrian, the uncorrected body trajectories 005 and 010 can be connected together to obtain a complete trajectory 605 as the corrected body trajectory of the pedestrian.

In another optional implementation of step S207, the plurality of same moments includes a first moment and a second moment. The set of matching relationship of the first moment includes that the first face identifier matches with the first body identifier and the set of matching relationship of the second moment includes that the first body identifier does not match any face identifier. This shows that the pedestrian corresponding to the first face identifier has actually reached the position of the body trajectory corresponding to the first body identifier at the second moment, but it has not been recognized from the face image frame collected at the second moment by the face camera. The reason for this situation may be that the direction of the pedestrian's face at the second moment may not be suitable enough to be captured by the face camera, causing the face camera to miss the shot. The position of the face camera is not considered as the position that the face trajectory should pass through.

In this case, the uncorrected face trajectory corresponding to the first face identifier could be modified to pass through the position on the body trajectory for the first body identifier at the second moment, or to pass through the location of the face camera that missed the shot at the second moment.

In a specific embodiment, FIG. 6 also shows a specific application scenario in which the method for correcting pedestrian trajectory of the foregoing embodiment of the present application is applied to correct a face trajectory. As a comparison, FIG. 1 shows the uncorrected face trajectory. As shown in FIG. 1, after steps S203 and S205, the uncorrected body trajectories 005 and 010 and the uncorrected face trajectory 020 have been obtained. The uncorrected body trajectory 005 corresponds to the body identifier of B_1 and the uncorrected body trajectory 010 corresponds to the body identifier of B_2. The uncorrected face trajectory 020 corresponds to the face identifier of F_1.

According to the set of matching relationship between the face identifier and the body identifier of each moment obtained in step S206, it is found that at the first moment, the face identifier F_1 matches with the body identifier B_2. At the second moment, the body identifier B_2 did not match any face identifier. This shows that the pedestrian corresponding to face identifier F_1 was missed in the detection at the second moment. Specifically, the first moment may be the moment when the pedestrian arrives in area 2, and the second moment may be the moment when the pedestrian arrives in area 3. Since the missed detection occurred at the second moment, the uncorrected face trajectory 020 directly came to area 4 after reaching area 2 without passing through area 3. For the missed detection at the second moment, in order to modify the uncorrected face trajectory, the uncorrected face trajectory can be adjusted to pass through the area 3 where the pedestrian has reached at the second moment to obtain the corrected face trajectory 610.

In another alternative embodiment, a matching relationship in the set of matching relationship of the first moment is that the first face identifier matches with the first body identifier, and a matching relationship in the set of matching relationship of the second moment is that the second face identifier matches with the first body identifier. This situation means that the first body identifier actually belongs to two different pedestrians. The reason for this situation may be that two pedestrians overlapped in the viewing range of the body camera, so that the body trajectories that originally belonged to the two people were considered to belong to the same person.

In this case, the body trajectory corresponding to the body identifier can be split. Since it has been determined that the first body identifier of the first moment and the first body identifier of the second moment actually belong to two pedestrians, it can be determined that the split point of the uncorrected body trajectory should be between the position of the trajectory at the first moment and the position of the trajectory at the second moment. Therefore, the trajectory can be split at a certain point between the position of the first moment and the position of the second moment. The body trajectories on the two sides of the split point belong to two pedestrians respectively. In order to improve the certainty of the corrected trajectories, the entire trajectory between the position of the first moment and the position of the second moment can be deleted. The body trajectory before the position of the first moment and the body trajectory after the position of the second moment belong to two pedestrians.

Figure 7:
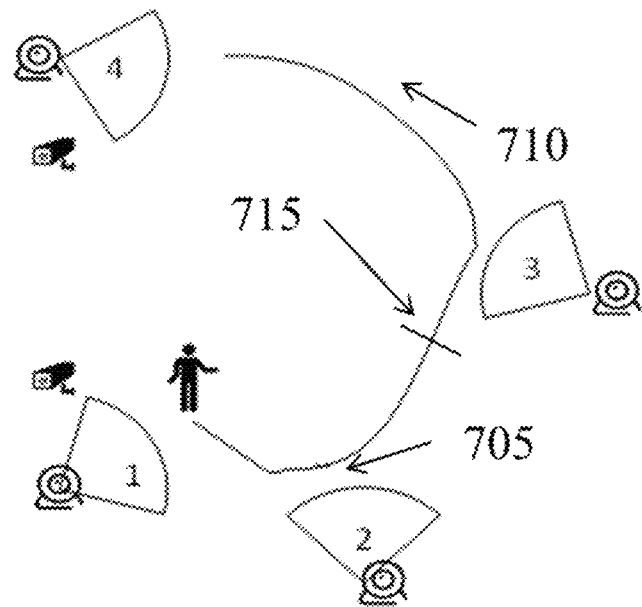
FIG. 7 schematically shows corrected trajectories obtained by using a method for correcting pedestrian trajectory according to another embodiment of the present application.
Figure 8:
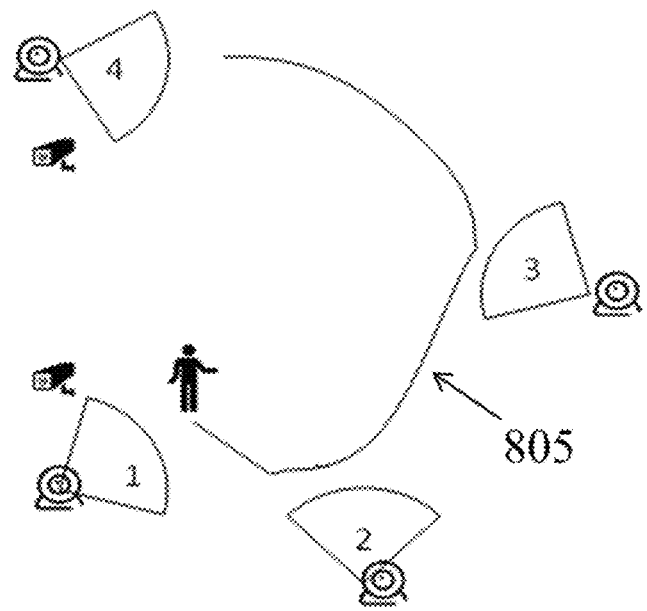
FIG. 8 schematically shows another uncorrected pedestrian trajectory.

Specifically, FIG. 7 shows a specific application scenario in which the method for correcting pedestrian trajectory in the foregoing embodiment of the present application is applied to correct the body trajectory. As a comparison, FIG. 8 shows the uncorrected body trajectory. As shown in FIG. 8, after steps S203 and S205, the uncorrected body trajectory 805 has been obtained, and its corresponding body identifier is B_1. In addition, according to the set of matching relationship between the face identifier and the body identifier of each moment obtained in step S206, it is found that at the first moment, the face identifier F_1 matches with the body identifier B_1. At the second moment, the face identifier F_2 matches with the body identifier B_1. These two matching relationships indicate that the body identifier B_1 actually belongs to different pedestrians at the first moment and the second moment. Therefore, the uncorrected body trajectory 805 needs to be disconnected or split. As shown in FIG. 7, the body trajectories 705 and 710 respectively before and after the split point 715 belong to different pedestrians. For example, the body trajectory 705 belongs to the pedestrian corresponding to the face identifier F_1, and the body trajectory 710 belongs to the pedestrian corresponding to the face identifier F_2.

In summary, the method for correcting the pedestrian trajectory provided by the embodiments of the application can match the pedestrian's face identifier and body identifier in an offline manner, and based on the matched face identifier and body identifier, determine to which pedestrian the face trajectory and the body trajectory correspond to correct the trajectory of the pedestrian. Through the above method, the inherent shortcomings of the face trajectory recognition algorithm and the body trajectory recognition algorithm can be overcome, and the pedestrian trajectory can be obtained more accurately. Moreover, this method is suitable for both face trajectory correction and body trajectory correction, so the user can get whatever type of trajectory it wants. As mentioned earlier, the body trajectory and the face trajectory are suitable for different occasions respectively. Therefore, the method for correcting the pedestrian trajectory in the embodiment of the present application is helpful for correcting the pedestrian trajectory in various occasions.

Figure 9:
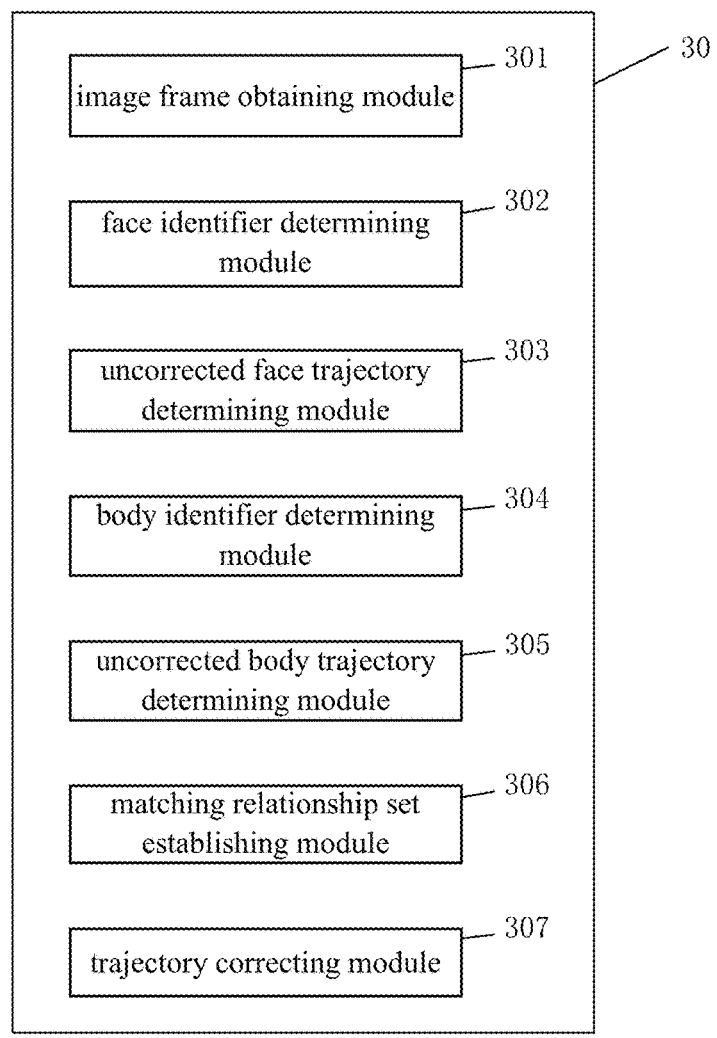
FIG. 9 schematically shows a structural block diagram of an apparatus for correcting pedestrian trajectory according to an embodiment of the present application.

According to another aspect of the present application, an apparatus for correcting pedestrian trajectory is provided. FIG. 9 schematically shows a structural block diagram of the apparatus. As shown in FIG. 9, the apparatus 30 for correcting pedestrian trajectory includes:

an image frame obtaining module 301, configured to obtain face image frames and body image frames;

a face identifier determining module 302, configured to determine a face identifier for a face area in each of the face image frames;

an uncorrected face trajectory determining module 303, configured to determine an uncorrected face trajectory corresponding to the face identifier;

a body identifier determining module 304, configured to determine a body identifier for a body area in each of the body image frames;

an uncorrected body trajectory determining module 305, configured to determine an uncorrected body trajectory corresponding to the body identifier;

a matching relationship set establishing module 306, configured to, for each of the face image frames and each of the body image frames that are at a same moment, establish a set of matching relationship between the face identifier and the body identifier; and a trajectory correcting module 307, configured to correct at least one of the uncorrected face trajectory and the uncorrected body trajectory based on a plurality of sets of matching relationship of a plurality of same moments.

In some embodiments, the matching relationship set establishing module 306 is specifically configured to: based on position coordinates of the face area and the body area corresponding to said same moment for the face identifier and the body identifier, determine a matching degree between the face identifier and the body identifier for said same moment, wherein the position coordinates of the face area and the body area are in a same coordinate system; and, based on the matching degree between the face identifier and the body identifier for said same moment, establish the set of matching relationship.

In some embodiments, the matching relationship set establishing module 306 is further specifically configured to: combine each of the face identifier and each of the body identifier into a group; based on the position coordinates of the face area and the body area of the face identifier and the body identifier in each of the group, determine an overlap ratio of the face area and the body area, so as to obtain the matching degree between the face identifier and the body identifier; and based on the overlap ratio of the face area and the body area corresponding to the face identifier and the body identifier, establish the set of matching relationship.

In some embodiments, the plurality of same moments comprises a first moment and a second moment, the face identifier comprises a first face identifier, and the body identifier comprises a first body identifier and a second body identifier. The trajectory correcting module 307 is configured to: in response to the set of matching relationship of the first moment comprising that the first face identifier matches with the first body identity and the set of matching relationship of the second moment comprising that the first face identifier matches with the second body identifier, determine that the first body identifier and the second body identifier correspond to a same pedestrian, and connect the uncorrected body trajectory for the first body identifier to the uncorrected body trajectory for the second body identifier to obtain a corrected body trajectory for said same pedestrian.

In some embodiments, the plurality of same moments comprises a first moment and a second moment, the face identifier comprises a first face identifier and a second face identifier, and the body identifier comprises a first body identifier. The trajectory correcting module 307 is configured to: in response to the set of matching relationship of the first moment comprising that the first face identifier matches with the first body identifier and the set of matching relationship of the second moment comprising that the second face identifier matches with the first body identifier, determine that the first body identifier corresponds to different pedestrians at the first moment and the second moment respectively, and split the uncorrected body trajectory for the first body identifier to obtain corrected body trajectories for said different pedestrians.

In some embodiments, the plurality of same moments comprises a first moment and a second moment, the face identifier comprises a first face identifier, and the body identifier comprises a first body identifier. The trajectory correcting module 307 is configured to: in response to the set of matching relationship of the first moment comprising that the first face identifier matches with the first body identifier and the set of matching relationship of the second moment comprising that the first body identifier does not match with any face identifiers, modify the uncorrected face trajectory for the first face identifier to be passing through a position of the body area of the first body identifier at the second moment to obtain a corrected face trajectory for a pedestrian corresponding to the first face identifier.

In some other embodiments, the apparatus 30 for correcting pedestrian trajectory includes a face processing module 310, a body processing module 320, and the aforementioned matching relationship set establishing module 306 and trajectory correcting module 307. The modules 301-305 in the foregoing embodiment can be arranged in the face processing module 310 and the body processing module 320, respectively.

Figure 10:
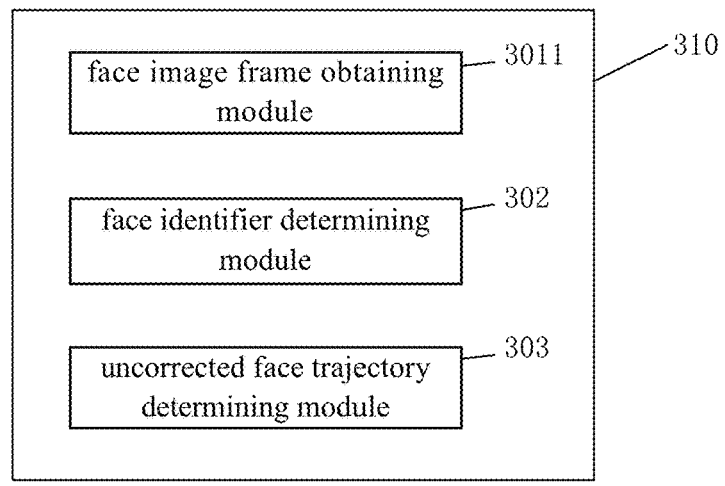
FIG. 10 schematically shows a structural block diagram of an apparatus for correcting pedestrian trajectory according to another embodiment of the present application.

FIG. 10 schematically shows a structural block diagram of the face processing module 310.

As shown in FIG. 10, the face processing module 310 includes:

a face image frame obtaining module 3011 configured to find the face image frame in the image frames acquired by the face camera;

a face identifier determining module 302, configured to determine the position coordinate of each face area in each face image frame; perform the feature extraction on each face area to obtain a face feature vector corresponding to each face area; compare the face feature vector with at least one of the sample face feature vectors in the sample face feature database to determine the face identifier of the face area corresponding to the face feature vector; establish the correspondence between the position coordinate of the face area and the face identifier;

a uncorrected face trajectory determining module 303, configured to determine the uncorrected face trajectory corresponding to each face identifier based on the coordinate position of the face area corresponding to the face identifier in each face image frame.

Figure 11:
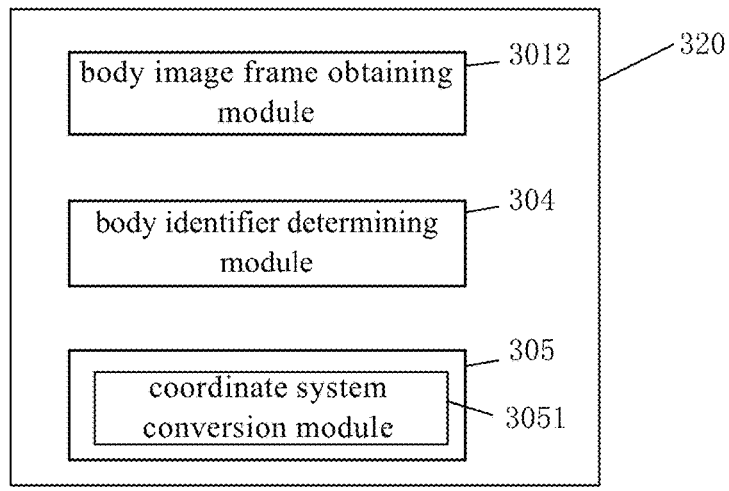
FIG. 11 schematically shows a structural block diagram of an apparatus for correcting pedestrian trajectory according to yet another embodiment of the present application.

FIG. 11 schematically shows a structural block diagram of the body processing module 320. As shown in FIG. 11, the body processing module 320 includes:

a body image frame obtaining module 3012, configured to find the body image frame in the image frames obtained by the body camera; the combination of the face image frame obtaining module 3011 and the body image frame obtaining module 3012 can realize the function of the image frame obtaining module 301 in the embodiment of FIG. 9;

a body identifier determining module 304, configured to determine the position coordinate of each body area in each body image frame; perform feature extraction on each body area to obtain the body feature vector corresponding to each body area; compare the body feature vector with at least one sample body feature vector in the sample body feature database to obtain a body identifier corresponding to the body feature vector;

an uncorrected body trajectory determining module 305, including a coordinate system conversion module 3051, which is configured to perform coordinate system conversion on the position coordinate of the body area to obtain the transformed body area position coordinate; the uncorrected body trajectory determining module 305 is also configured to establish a correspondence between the transformed body area position coordinate and the body identifier.

The apparatus for correcting pedestrian trajectory provided by the embodiments of the present application can combine the face information and the body information of the pedestrian in an offline manner to obtain more accurate pedestrian trajectory information, to facilitate the correction of the pedestrian trajectory.

Figure 12:
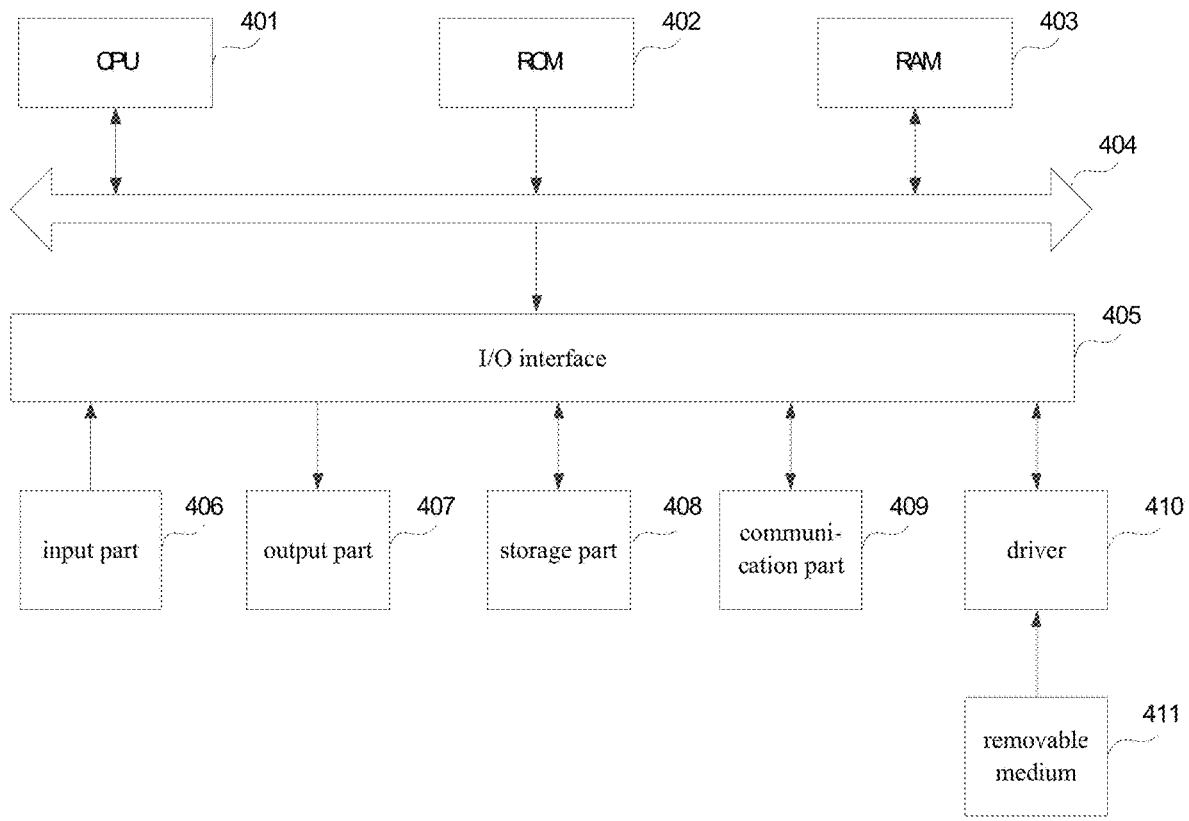
FIG. 12 schematically shows a structural diagram of a computing device according to an embodiment of the present application.

FIG. 12 is a computer device according to an exemplary embodiment. The computer device includes a central processing unit (CPU) 401, which can execute various appropriate actions and processes according to a program stored in a read-only memory (ROM) 402 or a program loaded into a random access memory (RAM) 403 from a storage part. In the RAM 403, various programs and data required for system operation are also stored. The CPU 401, the ROM 402, and the RAM 403 are connected to each other through a bus 404. An input/output (I/O) interface 405 is also connected to the bus 404.

The following components are connected to the I/O interface 405: an input part 406 including a keyboard, a mouse, etc.; an output part 407 including a cathode ray tube (CRT), a liquid crystal display (LCD) and a speaker, etc.; a storage part 408 including a hard disk, etc.; and a communication part 409 including a network interface card such as a LAN card, a modem, and the like. The communication part 409 performs communication processing via a network such as the Internet. A driver is also connected to the I/O interface 405 as needed. A removable medium 411, such as a magnetic disk, an optical disk, a magneto-optical disk, a semiconductor memory, etc., is installed on the driver 410 as needed, so that the computer program read therefrom is installed into the storage part 408 as needed.

In particular, according to the embodiments of the present application, the processes described in FIG. 3 and FIG. 5 above can be implemented as a computer software program. For example, each embodiment of the present application includes a computer program product, which includes a computer program carried on a computer-readable medium, and the computer program includes program code for executing the methods shown in the flowcharts. In such an embodiment, the computer program may be downloaded and installed from the network through the communication part, and/or installed from the removable medium. When the computer program is executed by the central processing unit (CPU) 401, the above-mentioned functions defined in the system of the present application are executed.

It should be noted that the computer-readable medium in this application may be a computer-readable signal medium or a computer-readable storage medium, or any combination of the two. The computer-readable storage medium may be, for example, but not limited to, an electrical, magnetic, optical, electromagnetic, infrared, or semiconductor system, device, or apparatus, or a combination of any of the above. More specific examples of computer-readable storage media may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In this application, the computer-readable storage medium may be any tangible medium that contains or stores a program, and the program may be used by or in combination with an instruction execution system, apparatus, or device. In this application, a computer-readable signal medium may include a data signal propagated in a baseband or as a part of a carrier wave, with a computer-readable program code carried therein. This propagated data signal can take many forms, including but not limited to electromagnetic signals, optical signals, or any suitable combination of the foregoing. The computer-readable signal medium may also be any computer-readable medium other than a computer-readable storage medium that may send, propagate, or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the above.

The flowcharts and block diagrams in the accompanying drawings illustrate the possible implementation architecture, functions, and operations of the methods, devices, and computer program products according to various embodiments of the present application. In this regard, each block in the flowchart or block diagram can represent a module, a program segment, or a part of code. The above-mentioned module, program segment, or part of code contains one or more executable instruction for realizing the specified logic function. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram or flowchart, and the combination of blocks in the block diagram or flowchart, can be implemented by a dedicated hardware-based system that performs the specified functions or operations, or can be implemented by a combination of dedicated hardware and computer instructions.

The units or modules involved in the embodiments of the present application can be implemented in software or hardware, and the described units or modules can also be provided in a processor. The names of these units or modules do not constitute a limitation on themselves under certain circumstances. The described unit or module may also be provided in a processor, for example, it may be described as: a processor includes an obtaining module, a determining module, an establishing module, and a correcting module. The names of these units or modules do not constitute a limitation on the unit or module itself under certain circumstances. For example, the obtaining module can also be described as "a module for obtaining face image frames and body image frames".

As another aspect, this application also provides a computer-readable medium. The computer-readable medium may be included in the electronic device described in the above-mentioned embodiments; or it may exist alone without being assembled into the electronic device. The aforementioned computer-readable medium carries one or more programs, and when the aforementioned one or more programs are executed by an electronic device, the electronic device realizes the method for correcting pedestrian trajectory as described in the aforementioned embodiments.

The present application also provides a computer program product or a computer program. The computer program product or computer program includes computer instructions, and the computer instructions are stored in a computer-readable storage medium. The processor of the computing device reads the computer instructions from the computer-readable storage medium, and the processor executes the computer instructions, so that the computing device executes the method for correcting pedestrian trajectory provided in the various embodiments described above.

The above description is only some embodiments of the present application and only explains the applied technical principles. Those skilled in the art should understand that the scope of this application is not limited to the technical solutions formed by the specific combination of the above technical features, but also covers other technical solutions formed by any combination of the technical features described above and their equivalent features, if not departing from the concept of this application, including, for example, the technical solution formed by exchanging the above-mentioned features with the technical features disclosed in this application with similar functions (but not limited thereto).

I claim:

1. A method for correcting pedestrian trajectory, comprising:
    obtaining face image frames and body image frames;
    determining a face identifier for a face area in each of the face image frames;
    determining an uncorrected face trajectory for the face identifier;
    determining a body identifier for a body area in each of the body image frames;
    determining an uncorrected body trajectory for the body identifier;
    for each of the face image frames and each of the body image frames that are at a same moment, establishing a set of matching relationship between the face identifier for the face area in said each of the face image frames and the body identifier for the body area in said each of the body image frames; and
    correcting at least one of the uncorrected face trajectory and the uncorrected body trajectory based on a plurality of sets of matching relationship of a plurality of same moments,
        wherein the uncorrected face trajectory is based on face position prior to correction,
        wherein the uncorrected body trajectory is based on body position prior to correction, and
        wherein the plurality of same moments comprises a first moment and a second moment, the face identifier comprises a first face identifier, and the body identifier comprises a first body identifier, and correcting at least one of the uncorrected face trajectory and the uncorrected body trajectory based on the plurality of sets of matching relationship of the plurality of same moments comprises:

in response to the set of matching relationship of the first moment comprising that the first face identifier matches with the first body identifier and the set of matching relationship of the second moment comprising that the first body identifier does not match with any face identifiers, modifying the uncorrected face trajectory for the first face identifier to be passing through a position of the body area of the first body identifier at the second moment to obtain a corrected face trajectory for a pedestrian corresponding to the first face identifier.

2. The method according to claim 1, wherein for each of the face image frames and each of the body image frames that are at the same moment, establishing the set of matching relationship between the face identifier for the face area in said each of the face image frames and the body identifier for the body area in said each of the body image frames comprises:
 based on position coordinates of the face area and the body area corresponding to said same moment for the face identifier and the body identifier, determining a matching degree between the face identifier and the body identifier for said same moment, wherein the position coordinates of the face area and the body area are in a same coordinate system; and
 based on the matching degree between the face identifier and the body identifier for said same moment, establishing the set of matching relationship.

3. The method according to claim 2, wherein based on the position coordinates of the face area and the body area corresponding to said same moment for the face identifier and the body identifier, determining the matching degree between the face identifier and the body identifier for said same moment comprises:
 combining each of the face identifier and each of the body identifier into a group;
 based on the position coordinates of the face area and the body area of the face identifier and the body identifier in each of the group, determining an overlap ratio of the face area and the body area, so as to obtain the matching degree between the face identifier and the body identifier; and
 wherein based on the matching degree between the face identifier and the body identifier for said same moment, establishing the set of matching relationship comprises:
 based on the overlap ratio of the face area and the body area, establishing the set of matching relationship.

4. The method according to claim 1, wherein the plurality of same moments comprises a first moment and a second moment, the face identifier comprises a first face identifier, and the body identifier comprises a first body identifier and a second body identifier, and correcting at least one of the uncorrected face trajectory and the uncorrected body trajectory based on the plurality of sets of matching relationship of the plurality of same moments comprises:
 in response to the set of matching relationship of the first moment comprising that the first face identifier matches with the first body identity and the set of matching relationship of the second moment comprising that the first face identifier matches with the second body identifier, determining that the first body identifier and the second body identifier correspond to a same pedestrian, and connecting the uncorrected body trajectory for the first body identifier to the uncorrected body trajectory for the second body identifier to obtain a corrected body trajectory for said same pedestrian.

5. The method according to claim 1, wherein the plurality of same moments comprises a first moment and a second moment, the face identifier comprises a first face identifier and a second face identifier, and the body identifier comprises a first body identifier, and correcting at least one of the uncorrected face trajectory and the uncorrected body trajectory based on the plurality of sets of matching relationship of the plurality of same moments comprises:
 in response to the set of matching relationship of the first moment comprising that the first face identifier matches with the first body identifier and the set of matching relationship of the second moment comprising that the second face identifier matches with the first body identifier, determining that the first body identifier corresponds to different pedestrians at the first moment and the second moment respectively, and splitting the uncorrected body trajectory for the first body identifier to obtain corrected body trajectories for said different pedestrians.

6. The method according to claim 1, wherein determining the face identifier for the face area in each of the face image frames comprises:
 determining the face area in each of the face image frames;
 performing feature extraction on the face area to obtain a face feature vector corresponding to the face area;
 comparing the face feature vector with sample face feature vectors in a sample face feature database to obtain a most similar sample face feature vector, wherein the most similar sample face feature vector is one of the sample face feature vectors that is most similar to the face feature vector, and wherein each of the sample face feature vectors in the sample face feature database has a corresponding face identifier;
 in response to a similarity between the face feature vector and the most similar sample face feature vector being greater than or equal to a preset similarity threshold, determining the corresponding face identifier of the most similar sample face feature vector as the face identifier of the face area; and
 in response to the similarity between the face feature vector and the most similar sample face feature vector being less than the preset similarity threshold, determining a new face identifier as the face identifier of the face area, wherein the new face identifier is different from the corresponding face identifier of any of the sample face feature vectors in the sample face feature database.

7. The method according to claim 1, wherein determining the body identifier for the body area in each of the body image frames comprises:
 determining the body area in each of the body image frames;
 performing feature extraction on the body area to obtain a body feature vector corresponding to the body area;
 comparing the body feature vector with sample body feature vectors in a sample body feature database to obtain a most similar sample body feature vector, wherein the most similar sample body feature vector is one of the sample body feature vectors that is most similar to the body feature vector, and wherein each of the sample body feature vectors in the sample body feature database has a corresponding body identifier;
 in response to a similarity between the body feature vector and the most similar sample body feature vector being greater than or equal to a preset similarity threshold, determining the corresponding body identifier of the most similar sample body feature vector as the body identifier of the body area; and in response to the similarity between the body feature vector and the most similar sample body feature vector being less than the preset similarity threshold, determining a new body identifier as the body identifier of the body area, wherein the new body identifier is different from the corresponding body identifier of any of the sample body feature vectors in the sample body feature database.

8. An apparatus for correcting pedestrian trajectory, comprising:

a memory; and a processor configured to execute operations comprising:

obtaining face image frames and body image frames;

determining a face identifier for a face area in each of the face image frames;

determining an uncorrected face trajectory corresponding to the face identifier;

determining a body identifier for a body area in each of the body image frames;

determining an uncorrected body trajectory corresponding to the body identifier;

establishing for each of the face image frames and each of the body image frames that are at a same moment, a set of matching relationship between the face identifier and the body identifier; and correcting at least one of the uncorrected face trajectory and the uncorrected body trajectory based on a plurality of sets of matching relationship of a plurality of same moments, wherein the uncorrected face trajectory is based on face position prior to correction, wherein the uncorrected body trajectory is based on body position prior to correction, and wherein the plurality of same moments comprises a first moment and a second moment, the face identifier comprises a first face identifier, and the body identifier comprises a first body identifier, and correcting at least one of the uncorrected face trajectory and the uncorrected body trajectory based on the plurality of sets of matching relationship of the plurality of same moments comprises:

in response to the set of matching relationship of the first moment comprising that the first face identifier matches with the first body identifier and the set of matching relationship of the second moment comprising that the first body identifier does not match with any face identifiers, modifying the uncorrected face trajectory for the first face identifier to be passing through a position of the body area of the first body identifier at the second moment to obtain a corrected face trajectory for a pedestrian corresponding to the first face identifier.

9. A computing device, comprising:

a memory configured to store computer-executable instructions; and a processor configured to execute the computer-executable instructions to cause the computing device to perform the method according to claim 1.

10. A non-transitory computer-readable storage medium, comprising computer-executable instructions that when executed by a processor of a computing device cause the processor to perform the method according to claim 1.

* * * * *